（12) United States Patent
Kuhn et al.

(10) Patent No.: US 8,359,110 B2
(45) Date of Patent: Jan. 22, 2013

(54) METHODS AND SYSTEMS FOR FAULT DIAGNOSIS IN OBSERVATION RICH SYSTEMS

(76) Inventors: Lukas D. Kuhn, Palo Alto, CA (US); Johan de Kleer, Los Altos, CA (US)

( * ) Notice: Subject to any disclaimer, the term of this patent is extended or adjusted under 35 U.S.C. 154(b) by 885 days.

(21) Appl. No.: 12/409,157

(22) Filed: Mar. 23, 2009

(65) Prior Publication Data

US 2010/0241251 A1    Sep. 23, 2010

(51) Int. Cl.
    *G05B 13/04*    (2006.01)
(52) U.S. Cl. .............. 700/31; 700/21; 700/29; 700/47; 700/79; 706/52
(58) Field of Classification Search ................ 700/31, 700/29, 47, 79, 21; 706/52
    See application file for complete search history.

(56) References Cited

U.S. PATENT DOCUMENTS

| | | | |
|---|---|---|---|
| 4,563,746 A | 1/1986 | Yoshida et al. |
| 5,006,992 A | 4/1991 | Skeirik |
| 5,009,833 A | 4/1991 | Takeuchi et al. |
| 5,023,045 A | 6/1991 | Watanabe et al. |
| 5,070,468 A | 12/1991 | Niinomi et al. |
| 5,127,005 A | 6/1992 | Oda et al. |
| 5,214,577 A | 5/1993 | Sztipanovits et al. |
| 5,268,834 A | 12/1993 | Sanner et al. |
| 5,305,426 A | 4/1994 | Ushioda et al. |
| 5,315,502 A | 5/1994 | Koyama et al. |
| 5,486,995 A | 1/1996 | Krist et al. |
| 5,521,814 A | 5/1996 | Teran et al. |
| 5,581,459 A | 12/1996 | Enbutsu et al. |
| 5,586,021 A | 12/1996 | Fargher et al. |
| 5,587,930 A | 12/1996 | Hori et al. |
| 5,701,934 A | 12/1997 | Kuran et al. |
| 5,748,496 A | 5/1998 | Takahashi et al. |
| 5,914,875 A | 6/1999 | Monta et al. |
| 6,012,152 A | 1/2000 | Douik et al. |
| 6,038,540 A | 3/2000 | Krist et al. |
| 6,113,256 A | 9/2000 | Bonissone et al. |
| 6,263,277 B1 | 7/2001 | Tanimoto et al. |
| 6,272,483 B1 | 8/2001 | Joslin et al. |
| 6,326,758 B1 | 12/2001 | Discenzo |
| 6,411,908 B1 | 6/2002 | Talbott |
| 6,415,276 B1 | 7/2002 | Heger et al. |
| 6,560,552 B2 | 5/2003 | Shen et al. |
| 6,643,592 B1 | 11/2003 | Loman et al. |
| 6,651,048 B1 | 11/2003 | Agrawal et al. |
| 6,725,208 B1 | 4/2004 | Hartman et al. |
| 6,735,549 B2 | 5/2004 | Ridolfo |
| 6,764,267 B2 | 7/2004 | Hart et al. |
| 6,795,798 B2 | 9/2004 | Eryurek et al. |
| 6,795,799 B2 | 9/2004 | Deb et al. |
| 6,847,854 B2 | 1/2005 | Discenzo |

(Continued)

OTHER PUBLICATIONS

European Search Report, EP 10 15 6820, Jul. 8, 2010.

(Continued)

*Primary Examiner* — Tejal Gami
(74) *Attorney, Agent, or Firm* — Fay Sharpe LLP

(57) ABSTRACT

Diagnostic systems and methods are presented for determining the current condition of a production plant and the resources thereof, in which successively more complex diagnostic abstractions are used to determine the plant condition, with a more complex abstraction being selected when the most recently selected diagnostic abstraction is logically inconsistent with the current fault status indications.

12 Claims, 12 Drawing Sheets

U.S. PATENT DOCUMENTS

| | | | |
|---|---|---|---|
| 6,853,930 | B2 | 2/2005 | Hayashi et al. |
| 6,879,973 | B2 | 4/2005 | Skaanning et al. |
| 6,895,292 | B2 | 5/2005 | Fromherz et al. |
| 6,898,475 | B1 | 5/2005 | Ruml et al. |
| 6,907,381 | B2 | 6/2005 | Hayashi et al. |
| 6,925,338 | B2 | 8/2005 | Eryurek et al. |
| 6,947,797 | B2 | 9/2005 | Dean et al. |
| 6,965,806 | B2 | 11/2005 | Eryurek et al. |
| 6,965,887 | B2 | 11/2005 | Huelsman et al. |
| 7,043,321 | B2 | 5/2006 | Ruml et al. |
| 7,062,478 | B1 | 6/2006 | Huelsman |
| 7,139,629 | B2 | 11/2006 | Fromherz et al. |
| 7,162,393 | B1 | 1/2007 | Vacar et al. |
| 7,164,954 | B2 | 1/2007 | Lefebvre et al. |
| 7,206,771 | B2 | 4/2007 | Alvarez et al. |
| 7,216,018 | B2 | 5/2007 | Zuo et al. |
| 7,230,736 | B2 | 6/2007 | Fromherz |
| 7,233,405 | B2 | 6/2007 | Fromherz |
| 7,346,404 | B2 | 3/2008 | Eryurek et al. |
| 7,356,383 | B2 | 4/2008 | Pechtl et al. |
| 7,433,743 | B2 | 10/2008 | Pistikopoulos et al. |
| 7,451,003 | B2 | 11/2008 | Chester et al. |
| 7,467,841 | B2 | 12/2008 | Kamisuwa et al. |
| 7,469,185 | B2 | 12/2008 | Mendrick et al. |
| 7,574,334 | B2 | 8/2009 | Tiwari et al. |
| 7,689,309 | B2 | 3/2010 | Zheng |
| 7,711,674 | B2 | 5/2010 | Arthur et al. |
| 7,725,857 | B2 | 5/2010 | Foltz et al. |
| 7,903,844 | B2 | 3/2011 | Satonaga et al. |
| 7,937,175 | B2 | 5/2011 | de Kleer et al. |
| 2002/0184176 | A1 | 12/2002 | Fromherz et al. |
| 2004/0002776 | A1 | 1/2004 | Bickford |
| 2004/0088207 | A1 | 5/2004 | Fromherz |
| 2006/0064291 | A1 | 3/2006 | Pattipatti et al. |
| 2006/0230313 | A1 | 10/2006 | Grichnick et al. |
| 2007/0043607 | A1 | 2/2007 | Howard et al. |
| 2007/0129834 | A1 | 6/2007 | Howard et al. |
| 2008/0010230 | A1 | 1/2008 | Smith et al. |
| 2008/0010522 | A1 | 1/2008 | Uwatoko et al. |
| 2008/0039969 | A1 | 2/2008 | Liu et al. |
| 2008/0062211 | A1 | 3/2008 | Kamisuwa et al. |
| 2008/0071716 | A1 | 3/2008 | Anderson et al. |
| 2008/0148257 | A1 | 6/2008 | Ruml et al. |
| 2008/0215509 | A1 | 9/2008 | Charlton |
| 2009/0043809 | A1 | 2/2009 | Fakhouri et al. |
| 2009/0183777 | A1 | 7/2009 | Herman et al. |
| 2009/0204234 | A1 | 8/2009 | Sustaeta et al. |
| 2009/0204237 | A1 | 8/2009 | Sustaeta et al. |
| 2009/0204245 | A1 | 8/2009 | Sustaeta et al. |
| 2009/0204267 | A1 | 8/2009 | Sustaeta et al. |
| 2009/0210081 | A1 | 8/2009 | Sustaeta et al. |
| 2009/0228408 | A1 | 9/2009 | Kaushal et al. |
| 2009/0240366 | A1 | 9/2009 | Kaushal et al. |
| 2009/0265025 | A1 | 10/2009 | Brown |
| 2010/0010654 | A1 | 1/2010 | de Kleer et al. |
| 2010/0138026 | A1 | 6/2010 | Kaushal et al. |
| 2010/0222897 | A1* | 9/2010 | Qiao et al. .................. 700/21 |

OTHER PUBLICATIONS

Communication pursuant to Article 94(3) EPC, May 18, 2011.
Do, "Partial Satisfaction (Over-Subscription) Planning as Heuristic Search," 2004, Proceedings of KBCS-04.
de Kleer, "Diagnosing Multiple Faults," 1987, Artificial Intelligence, vol. 32, pp. 97-130.
Hamscher, "Issues in Model Based Troubleshooting," 1987, MIT A.I. Lab Memo 893.
Wu, "Scheduling with uncertain durations: generating B-robust scheduled using constraint programming.,"ICAPS 2006 Workshop on Constraint Satisfaction Techniques for Planning and Scheduling Problems, pp. 134-137.
Do, "Sapa: A Scalable Multi-objective Heuristic Metric Temporal Planner,"2003, Journal of Artificial Intelligence Research, pp. 155-194.
Do, "Improving the Temporal Flexibility of Position Constrained Metric Temporal Plans,"2003, Proceedings of ICAPS '03, pp. 42-51.
de Kleer, "Fundamentals of Model-Based Diagnosis,"2003, Proceedings of the 5th IFAC Symposium on Fault Detection, Supervision, and Safety of Technical Processes, pp. 25-36.
van den Briel, "Effective Approaches for Partial Satisfaction (Over-Subscription) Planning,"2004, in Ninteenth National Conference on Artificial Intelligence (AAA1), pp. 562-569.
Bacchus, "Graphical models for preference and utility," 1995, In Proceedings of UAI.
Smith, "Choosing Objectives in Over-Subscription Planning, " 2004, Proceedings of ICAPs-04, pp. 393-401.
Hoffman, "FF: The fast-forward planning system," 2001, A1 Magazine, vol. 22, No. 3, pp. 57-62.
Provan, Model-Based Diagnosis and Control Reconfiguration for Discrete Event Systems: An Integrated Approach, 1999, Proceedings of the 38th Conference on Decision & Control, pp. 1762-1768.
Ruml, "On-line Planning and Scheduling for High-speed Manufacturing," 2005, ICAPS, pp. 30-39.
Verron, "A New Procedure Based on Mutual Information for Fault Diagnosis of Industrial Systems," published in Workshop on Advanced Control and Diagnosis, 2006.
Arora, R.; and Hsiao, M.S., "Enhancing SAT-based Bounded Model Checking Using Sequential Logic Implications", Aug. 2004, 17th Intl Conference on VLSI Design, ISBN 0-765-2072-3, IEEE Xplore Digital Library.
Basu, S. and Kumar, R., "Quotient-Based Control Synthesis for Partially Observed Non-Deterministic Plants with Mu-Calculus Specifications", Dec. 2007, Proceedings of the 46th IEEE Conference on Decision and Control, ISBN 1-4244-1498-9, IEEE Xplore Digital Library.
Darwiche, A., "Decomposable Negation Normal Form", Jul. 2001, Journal of the ACM, vol. 48, No. 4, pp. 608-647.
Deng, S.; Bian, J.; Wu, W.; Yang, X.; and Zhao, Y.; "EHSAT: an Efficient RTL Satisfiability Solver Using an Extended DPLL Procedure", Jun. 2007, Design Automation Conference 2007, ACM Online.
Elliot, P., "An Efficient Projected Minimal Conflict Generator for Projected Prime Implicate and Implicate Generation", Feb. 2004, Massachusetts Institute of Technology, Department of Aeronautics and Astronautics.
Gopalakrishnan, S; Durairaj, V. and Kall, P., "Integrating CNF and BDD Based SAT Solvers", Nov. 2003, 8th IEEE Intl High-Level Design Validation and Test Workshop, ISBN 0-7803-8236-6, IEEE Xplore Digital Library.
Thittamaranahalli, S.K., "Contributions to Algorithmic Techniques in Automated Reasoning About Physical Systems", Mar. 2005, Stanford University, Department of Computer Science.
Voronov, A. and Akesson, K., "Supervisory Control Using Satisfiablity Solvers", May 2008, Proceedings for the 9th Intl Workshop on Discrete Event Systems, ISBN 1-4244-2593-8, IEEE Xplore Digital Library.
Vahidi, A.; Fabian, M. and Lennartson, B., "Generic Resource Booking Models in Flexible Cells", Sep. 2001, Proceedings of the 2001 IEEE Intl Symposium on Intelligent Control, ISBN 0-783-6722-7, IEEE Xplore Digital Library.
European Search Report, EP 09 16 4978, Sep. 16, 2009.
European Search Report, EP 10156820.2, Aug. 7, 2010.
Rina Dechter and Juea Pearl, "Generalized Best-First Search Strategies and the Optimality of A", University of California, Los Angeles, California, Journal of the Association for Computing Machinery, vol. 32, No. 3, Jul. 1985, pp. 505-536.
Peter E. Hart, "A formal basis for the heuristic determination of minimum cost paths", IEE Transactions of Systems Science and Cybernetics, SSC-4, No. 2, Jul. 1968.
Minh Do and Wheeler Ruml, "Lessons Learned in Applying Domain-Independent Planning to High-Speed Manufacturing", Palo Alto Research Center, 2006.
Richard Dearden and Dan Clancy, "Particle Filters for Real-Time Fault Detection in Planetary Rovers", Research Institute for Advanced Computer Science, NASA Ames Research Center.
Patrick Haslum and Hector Geffner, "Heuristic Planning with Time and Resources", Department of Computer Science, Linkoping University, Sweden, Departmento de Computacion, Universidad Simon Bolivar, Venezuela.

Markus P.J. Fromherz, Daniel G. Bobrow, and Johan De Kleer, "Model-based computing for Design Control of Reconfigurable Systems", Palo Alto Research Center, Published in AL Magazine, Special Issue on Qualitative Reasoning, vol. 24, n. 4, 2003 pp. 120-130.

Roberto Cervoni, Amedeo Cesta, An Angelo Oddi, "Managing Dynamic Temporal Constraint Networks", National Research Council of Italy.

Arash Vahidi, Martin Fabian, Bengt Lennartson, "Generic Resource Booking Models in Flexible Cells", Control and Automation Laboratory Department of Signals and Systems, Chalmers University of Technology, 2001 IEEE.

Patrick Haslum and Hector Geffner, "Heuristic Planning with Time and Resources", Department of Computer Science, Linkoping University, Sweden, Departamento de Computacion, Universidad Simon Bolivar, Venezuela.

Markus P.J. Fromherz, Daniel G. Bobrow, and Johan De Kleer, "Model-based Computing for Design and Control of Reconfigurable Systems", Palo Alto Research Center, Published in AI Magazine, Special Issue on Qualitative Reasoning, vol. 24, n. 4, 2003 pp. 120-130.

Roberto Cervoni, Amedeo Cesta, and Angelo Oddi, "Managing Dynamic Temporal Constraint Networks", National Research Council of Italy.

Rina Dechter and Judea Pearl, "Generalized Best-First Search Strategies and the Optimality of A", University of California, Los Angeles, California, Journal of the Association for Computing Machinery, vol. 32, No. 3, Jul. 1985, pp. 505-536.

Peter E. Hart, Nils J. Nilsson, and Bertram Raphael, "A Formal Basis for the Heuristic Determination of Minimum Cost Paths", IEEE Transactions of Systems Science and Cybernetics, vol. ssc-4. No. 2, Jul. 1968.

Nykanen, Matt et al; "Finding Paths with the Right Cost"; 1999; Springer-Verlag Berlin Heidelberg; STAGS '99—Lecture Notes in Computer Science, vol. 1563/1999; pp. 345-355.

Nykanen, Matt et al.; The Exact Path Length Problem, 2002; Elsevier Science; Journal of Algorithms 42; pp. 41-53.

Faloutos, Christos et al.; "Connection Subgraphs in Social Networks"; 2004; Proceedings of the Workshop on Link Analysis, Counterterrorism, and Privacy (in conj. with SIAM International Conference on Data Mining); 12 pages.

Faloutos, Christos et al.; "Fast Discovery of Connection Subgraphs"; 2004; ACM; KDD'04; pp. 118-127.

Ramakrishnan, Cartic et al.; "Discovering Informative Connection Subgraphs in Multi-relation Graphs"; 2005; ACM New York, NY; ACM SIGKdd Explorations Newsletter, vol. 7, Issue 2; pp. 56-63.

\* cited by examiner

| TIME | PLAN | OBSERVATION | CONCLUSION |
|---|---|---|---|
| 1 | A,B | FAIL | ¬M EXONERATES C |
| 2 | B,C | SUCCESS | ¬I EXONERATES B,C |
| 3 | A | SUCCESS | ¬I EXONERATES A |

| t | p | z | g (good) | b (bad) | x (unknown) | su (suspected( |
|---|---|---|---|---|---|---|
| 0 | | | | | ABCDEF | |
| 1 | ABCDE | f | | | F | ABCDE |
| 2 | ABC | f | DE | | F | ABC |
| 3 | ADE | s | ADE | | F | BC |
| 4 | ABDE | f | ACDEF | B | | |

*FIG. 11*

Algorithm 1: Single Faults Algorithm $g_t = g_{t-1}$; $b_t = b_{t-1}$; $x_t = x_{t-1} - p_{j,t}$;
$su_t = su_{t-1}$;
if plan p fails at time t then
    $rp_{j,t} = p_j - g_t$;
    if $|rp_{j,t}| = 1$ then
        $b_t = rp_{j,t}$;
        $g_t = (g_t \cup x_t \cup su_t) - b_t$;
        $x_t = su_t = \varnothing$;
        *DONE!*;
    else
        if $su_{t-1} = \varnothing$ then
            $su_t = rp_{j,t}$;
        else
            $su_t = su_{t-1} \cap rp_{j,t}$;
            $g_t = (su_{t-1} \cup rp_{j,t}) - su_t$;
            if $|su_t| = 1$ then
                $b_t = su_t$;
                $g_t = g_t \cup x_t$;
                $x_t = su_t = \varnothing$;
                *DONE!*;
else
    $g_t = g_{t-1} \cup p_j$;
    $su_t = su_{t-1} - g_t$;
    if $|su_t| = 1$ then
        $b_t = su_t$;
        $g_t = g_t \cup x_t$;
        $x_t = su_t = \varnothing$;
        *DONE!*;

*FIG. 12*

Algorithm 2: Multiple Faults Algorithm
$gt = gt-1$; $bt = bt-1$; $xt = xt-1 - pj,t$;
foreach $sui,t-1 : DFt-1$ do
| $sui,t = sui,t-1$; $sci,t = sci,t-1$;
if plan $p$ fails at time $t$ then
| $rpj,t = pj - gt$;
| if $|rpj,t| = 1$ then
| | $bt = bt \cup rpj,t$;
| | foreach $sui,t-1 : DFt-1$ do
| | | if $(sui,t-1 \cup sci,t-1) \cap rpj,t \neq \varnothing$ then
| | | | $xt = (xt \cup sui,t-1 \cup sci,t-1 \cup rpj,t) - bt$;
| | | | $sui,t = \varnothing$;
| | | | $sci,t = \varnothing$;
| else
| | if
| | $rpj,t \cap \cup i(sui,t-1 \cup sci,t-1) = \varnothing \wedge rpj \cap bt = \varnothing$
| | then
| | | $sunew,t = rpj,t$;
| | | $scnew,t = \varnothing$;
| | else
| | | if $rpj,t \cap bt = \varnothing$ then
| | | | foreach $sui,t-1 : DFt-1$ do
| | | | | if $rpj,t \cap (sui,t-1 \cup sci,t-1)$ then
| | | | | | if $|rpj,t| < |sui,t-1 \cup sci,t-1| \wedge$
| | | | | | $rpj,t - (sui,t-1 \cup sci,t-1) \subseteq xt$
| | | | | | then
| | | | | | | $xt =$
| | | | | | | $(xt \cup sui,t-1 \cup sci,t-1) - rpj,t$;
| | | | | | | $sui,t =$
| | | | | | | $rpj,t \cap (sui,t-1 \cup sci,t-1)$;
| | | | | | | $sci,t = rpj,t - sui,t$;
| | | | | | else
| | | | | | | $sui,t =$
| | | | | | | $rpj,t \cap (sui,t-1 \cup sci,t-1)$;
| | | | | | | $sci,t =$
| | | | | | | $(sui,t-1 \cup sci,t-1) - rpj,t$;
| | | else
| | | | foreach $sui,t-1 : DFt-1$ do
| | | | | if $rpj,t \cap sui,t-1 \neq \varnothing$ then
| | | | | | $sui,t = rpj,t \cap sui,t-1$;
| | | | | | $sci,t = (sui,t-1 \cup sci,t-1) - sui,t$;
else
| $gt = gt-1 \cup pj$;
| $xt = xt - gt$;
| foreach $sui,t-1 : DFt-1$ do
| | $sui,t = sui,t-1 - gt$;
| | $sci,t = sci,t-1 - gt$;
| if $|sui,t \cup sci,t| = 1$ then
| | $bt = bt \cup sui,t \cup sci,t$;
| if $sui,t = \varnothing$ then
| | $sui,t = sci,t$;

| t | p | z | g | b | x | df₁ | | df₂ | |
|---|---|---|---|---|---|---|---|---|---|
| | | | | | | su₁ | sc₁ | su₂ | sc₂ |
| 0 | | | | | ABCDE | | | | |
| 1 | ABCDE | f | | | | ABCDE | | | |
| 2 | ABC | f | | | DE | ABC | | | |
| 3 | ADE | f | | | DE | A | BC | | |
| 4 | A | s | A | | | BC | | | |
| 5 | ADE | f | A | | | BC | | DE | |
| 6 | AC | s | AC | B | | | | DE | |
| 7 | ADC | f | AC | BD | | | | | |
| 8 | ACE | s | ACE | BD | | | | | |

| t | p | z | g | b | df₁ | | | df₂ | | |
|---|---|---|---|---|---|---|---|---|---|---|
| | | | | | su₁ | sc₁ | lg₁ | su₂ | sc₂ | lg₂ |
| 0 | | | | | | | | | | |
| 1 | ABCDE | f | | | ABCDE | | | | | |
| 2 | ABC | f | | | ABC | | | | | |
| 3 | ADE | f | | | A | BC | | | | |
| 4 | A | s | A' | | BC | | A' | | | |
| 5 | ADE | f | A' | | BC | | A' | DE | | A' |
| 6 | AC | s | AC' | B | | | AC' | DE | | A' |
| 7 | ADC | f | AC | D | | | | | | |
| 8 | ACE | s | ACE' | D | B | | AC' | | | |
| 9 | B | s | ACE',B' | D | [AB][BC] | | AC',B' | | | |
| 10 | AB | s | ACE',B' | [AB],D | | | | | | |

*FIG. 15*

*Algorithm 3: Multiple Dependent Faults Algorithm*
*update data structure;*
if *plan p fails at time t* then
> if *$\{p_{j,t}\}$ is a single minimal candidate* then
> > $b_t = b_t \cup \{p_{j,t}\}$;
> > foreach $df_{i,t-1} : DF_{t-1}$ do
> > > if *$\{p_{j,t}\}$ is relevant to $df_{i,t-1}$* then
> > > > $lg_{i,t} = \emptyset$;
> > > > $su_{i,t} = \emptyset$;
> > > > $sc_{i,t} = \emptyset$;
> 
> else
> > if *$p_{j,t}$ is not relevant to any $df_{i,t-1}$ and $p_{j,t}$*
> > *doesn't contain a known fault* then
> > > start new diagnosis focus;
> > > foreach *$g \in g_{t-1}$* do
> > > > $lg_{new,t} = lg_{new,t} \cup \overline{(E(g) \cap p_j)}$;
> > > 
> > > $SU_{new,t} =$
> > > $MinimalCandidates(p_{j,t}, lg_{new,t})$;
> > > $SC_{new,t} = \emptyset$;
> > 
> > else
> > > if *$p_{j,t}$ is relevant to any $df_{i,t-1}$ but $p_{j,t}$*
> > > *doesn't contain a known fault* then
> > > > if *$p_{j,t}$ defines smaller diagnosis focus*
> > > > *than $df_{i,t-1}$* then
> > > > > clear $df_{i,t-1}$;
> > > > > start new diagnosis focus with $p_{j,t}$;
> > > > 
> > > > else
> > > > > $df_{i,t} = NarrowFocus(df_{i,t-1}, p_{j,t})$
> > > 
> > > else
> > > > if *$p_{j,t}$ is relevant to any $df_{i,t-1}$* then
> > > > > foreach *$su \in su_{i,t}$* do
> > > > > > $su_{i,t} = su_{i,t} \cup \{(p_{j,t} \setminus E(su))\}$;
> > > > > > $sc_{i,t} = (su_{i,t-1} \cup sc_{i,t-1}) - su_{i,t}$;

else
> $g_t = g_{t-1} \cup \overline{p_j}$;
> foreach $su_{i,t-1} : DF_{t-1}$ do
> > $lg_{i,t} = lg_{i,t} \cup$
> > $\overline{(E(lg_{i,t}) \cup E(su_{i,t-1}) \cup E(sc_{i,t-1})) \cap p_j}$;
> > $su_{i,t} = su_{i,t-1} - lg_{i,t}$;
> > $sc_{i,t} = sc_{i,t-1} - lg_{i,t}$;
> 
> if $su_{i,t} = $ ; then
> > $su_{i,t} = sc_{i,t}$;
> 
> if $su_{i,t} \cup sc_{i,t} = \emptyset$ then
> > $su_{i,t} = MinimalCandidates(lg_{i,t})$;

METHODS AND SYSTEMS FOR FAULT DIAGNOSIS IN OBSERVATION RICH SYSTEMS

BACKGROUND

The present exemplary embodiments relate to control systems and diagnosis systems thereof for fault diagnosis in production plants that include multiple resources for achieving production goals. Automated diagnosis of system performance and component status can advantageously aid in improving productivity, identifying faulty or underperforming resources, scheduling repair or maintenance, etc. Accurate diagnostics requires information about the true condition of components in the production system, which can be obtained directly from sensors associated with individual components and/or may be inferred from a limited number of sensor readings within the production plant using a model or other knowledge of the system structure and dynamics. Complete sensor coverage for all possible system faults is generally cost prohibitive and/or impractical in harsh production environments, and thus it is generally preferable to instead employ diagnostic procedures to infer the source of faults detected or suspected from limited sensors. Conventional automated diagnosis systems focus on a single set of assumptions regarding fault possibilities, for example, where only single persistent faults are assumed. Complex diagnostic assumptions, while generally able to correctly identify a wider range of fault conditions, are computation intensive and thus expensive to implement. Over simplified assumptions, however, may not be able to accurately assess the condition of the production system and its components. Accordingly, a need remains for improved control and diagnostic systems and techniques by which automated diagnosis can be performed in an accurate and efficient manner to determine a current plant condition for a production system having only limited sensor coverage.

BRIEF DESCRIPTION

The present disclosure provides systems and methods for controlling the operation of a production system and for determining the current resource condition of a production plant, as well as computer readable media with instructions therefor, in which a diagnosis system employs different diagnostic abstractions with progressively more complex fault assumptions in identifying faulty components, and which may also identify combinations of components that cause system faults when used together (interaction fault identification capabilities). The disclosure may be advantageously employed to facilitate an integrated multi-faceted approach to qualitative model-based reasoning in diagnosing production plant faults, including effective, efficient use of diagnostic system resources and the ability to detect and diagnose interaction faults caused by the conjunction or interaction of two components, neither of which may be individually faulted, but which together cause a fault.

In accordance with one or more aspects of the present disclosure, a control system is provided for controlling operation of a production system with a plant. The control system is comprised of a planner, a plant model, and a diagnosis system, with the planner providing plans for execution using one or more plant resources in the plant. The diagnosis system includes diagnostic abstractions that individually represent one or more fault assumptions about resources of the plant, where the complexity of the fault assumptions of each diagnostic abstraction being different. For example, one or more fairly simple diagnostic assumptions may relate to single, persistent and/or non-interaction faults, whereas more complex assumptions involve multiple faults, intermittent faults and/or interaction faults. The diagnosis system further includes a belief model comprising at least one fault status indication for at least one resource of the plant, and a diagnoser. The diagnoser is comprised of an abstraction diagnosis component and a domain diagnosis component. The abstraction diagnosis component initially selects the simplest or least complex diagnostic abstraction, such as single, non-interaction, persistent fault assumptions for use in automated diagnosis of the system and its resources or components. The domain diagnosis component determines the current plant condition and updates the belief model according to the selected abstraction, the plant model, and one or more previously executed plans and corresponding observations. When the selected diagnostic abstraction is found to be logically inconsistent with the current fault status indications in the belief model, the abstraction diagnosis component selects abstractions having successively more complex assumptions. In this manner, the most simple assumptions are used to the extent possible in order to efficiently utilize the diagnosis system resources, and thereafter progressively more complex assumptions are used as needed to promote accuracy in the diagnosis. The domain diagnosis component in certain embodiments is also operative to identify interaction faults that involve the interaction of two or more plant resources. In accordance with other aspects of the disclosure, moreover, the belief model comprises a list of good or exonerated resources of the plant, a list of bad or suspected resources of the plant, and a list of unknown resources of the plant, and/or the belief model may indicate a fault probability for one or more plant resources.

In accordance with still further aspects of the disclosure, a method is provided for determining a current condition of resources of a production plant. The method includes selecting a first diagnostic abstraction having the least complex fault assumption or assumptions regarding resources of the plant, and determining the current plant condition based at least partially on the currently selected diagnostic abstraction, a previously executed plan, one or more corresponding observations from the plant, and the plant model. The method also includes selectively selecting another diagnostic abstraction having more complex fault assumptions when a most recently selected diagnostic abstraction is logically inconsistent with the current fault status indications. In certain embodiments, the method may also include maintaining a belief model comprising at least one fault status indication for at least one resource of the plant, and updating the belief model based at least partially on the currently selected diagnostic abstraction, a previously executed plan, at least one corresponding observation from the plant, and the plant model. The method may also include determining a current plant condition comprises identifying at least one interaction fault involving interaction of two or more resources of the plant according to further aspects of the disclosure.

Still other aspects of the disclosure provide a computer readable medium with computer executable instructions for selecting a first one of a plurality of diagnostic abstractions having the least complex fault assumption or assumptions regarding resources of a production plant, determining a current plant condition based at least partially on the currently selected diagnostic abstraction, a previously executed plan and corresponding observations from the plant, and a plant model, as well as instructions for selectively selecting another one of the diagnostic abstractions having more complex fault assumptions when a most recently selected diagnostic abstraction is logically inconsistent with the current fault status indications. The medium may include further computer executable instructions for maintaining a belief model comprising at least one fault status indication for at least one resource of the plant, and updating the belief model based at least partially on the currently selected diagnostic abstraction, a previously executed plan, at least one corresponding observation from the plant, and the plant model.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

FIG. 11 is a table illustrating exemplary executed plans and corresponding observations from the system of FIG. 6 along with the corresponding system diagnostic condition conclusions for a single persistent fault assumption;

FIG. 12 is an exemplary algorithm performed by the diagnoser in FIGS. 1-3 and 9 to determine the plant condition for a single fault assumption;

FIG. 13 is another exemplary algorithm performed by the diagnoser in FIGS. 1-3 and 9 to determine the plant condition for a multiple fault assumption;

FIG. 14 is a table illustrating exemplary executed plans and corresponding observations from the system of FIG. 6 along with the corresponding system diagnostic condition conclusions for a multiple fault assumption;

FIG. 15 is a table illustrating exemplary executed plans and corresponding observations from the system of FIG. 6 along with the corresponding system diagnostic condition conclusions for a multiple interaction fault assumption; and FIG. 16 is another exemplary algorithm performed by the diagnoser in FIGS. 1-3 and 9 to determine the plant condition for a multiple interaction fault assumption.

DETAILED DESCRIPTION

Figure 1:
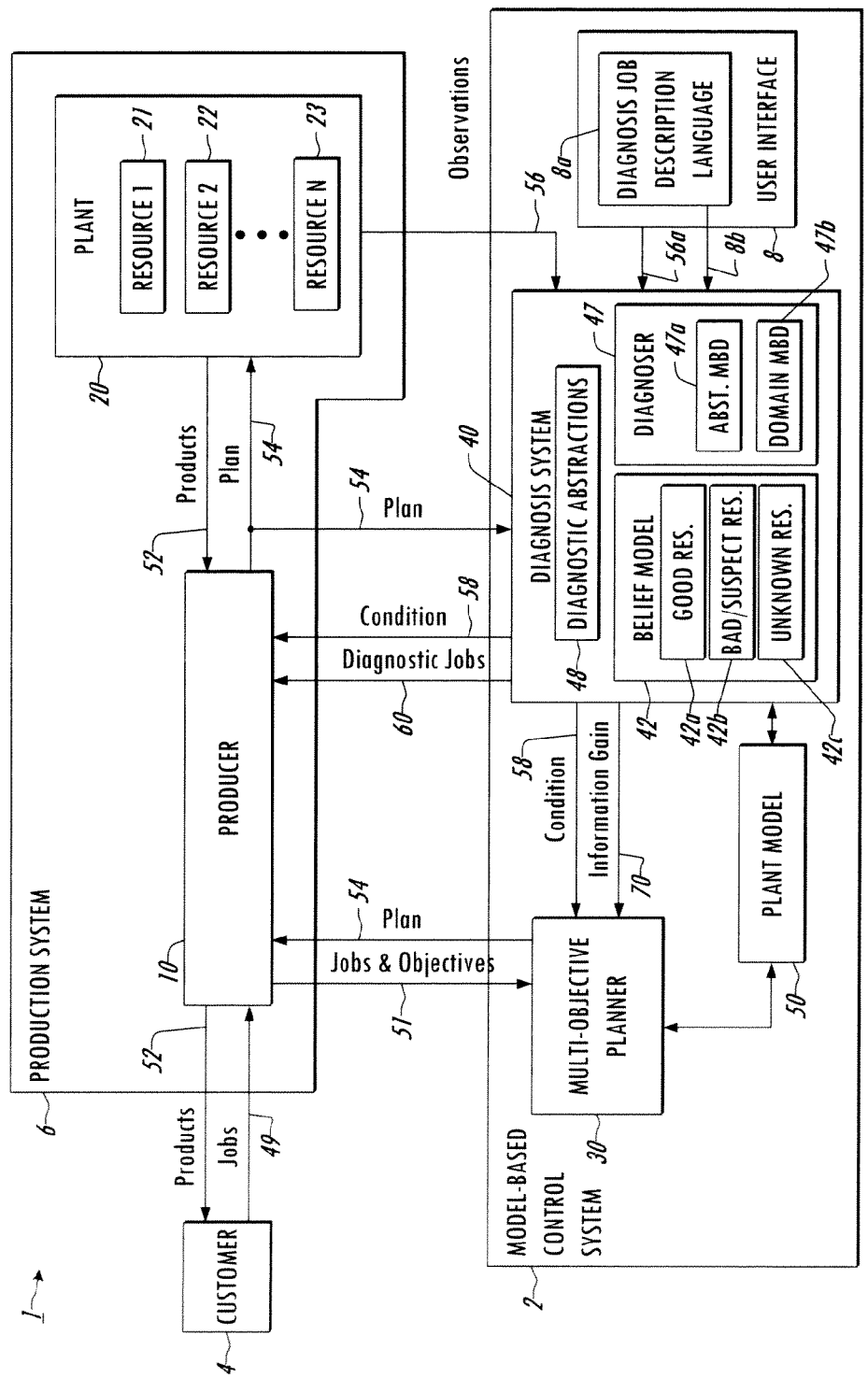
FIG. 1 is a schematic diagram illustrating a production system and an exemplary model-based control system with a planner, a plant model, and a diagnosis system according to one or more aspects of the disclosure.

Referring now to the drawing figures, several embodiments or implementations of the present disclosure are hereinafter described in conjunction with the drawings, wherein like reference numerals are used to refer to like elements throughout, and wherein the various features, structures, and graphical renderings are not necessarily drawn to scale. The disclosure relates to diagnosing production systems generally and is hereinafter illustrated and described in the context of exemplary document processing systems having various printing and document transport resources. However, the concepts of the disclosure also find utility in diagnosing the current condition of plant resources in product packaging systems and any other type or form of system in which a plurality of resources, whether machines, humans, software or logic components, objects, etc., are selectively employed according to plans comprised of a series of actions to achieve one or more production goals, wherein all such alternative or variant implementations are contemplated as falling within the scope of the present disclosure and the appended claims.

The various aspects of the disclosure are hereinafter illustrated and described in association with systems in which a given production goal can be achieved in two or more different ways, including use of different resources (e.g., two or more print engines that can each perform a given desired printing action, two different substrate routing paths that can be employed to transport a given printed substrate from one system location to another, etc.), and/or the operation of a given system resource at different operating parameter values (e.g., operating substrate feeding components at different speeds, operating print engines at different voltages, temperatures, speeds, etc.). In order to diagnose faulty resources (e.g., modules, components, etc.) in such production systems, a diagnosis system of the control system utilizes a plant model along with executed plans and the corresponding plant observations to determine the current plant condition using a currently selected diagnostic abstraction that represents one or more fault assumptions regarding the plant resources, where the selected abstraction is changed to successively more complex assumptions when the diagnostic system reaches a logical inconsistency between the current fault status indications and the most recently selected diagnostic abstraction. In this manner, the diagnosis system can advance understanding of the plant condition using the least complex assumptions that are consistent with the observed system behavior in an efficient manner.

Figure 2:
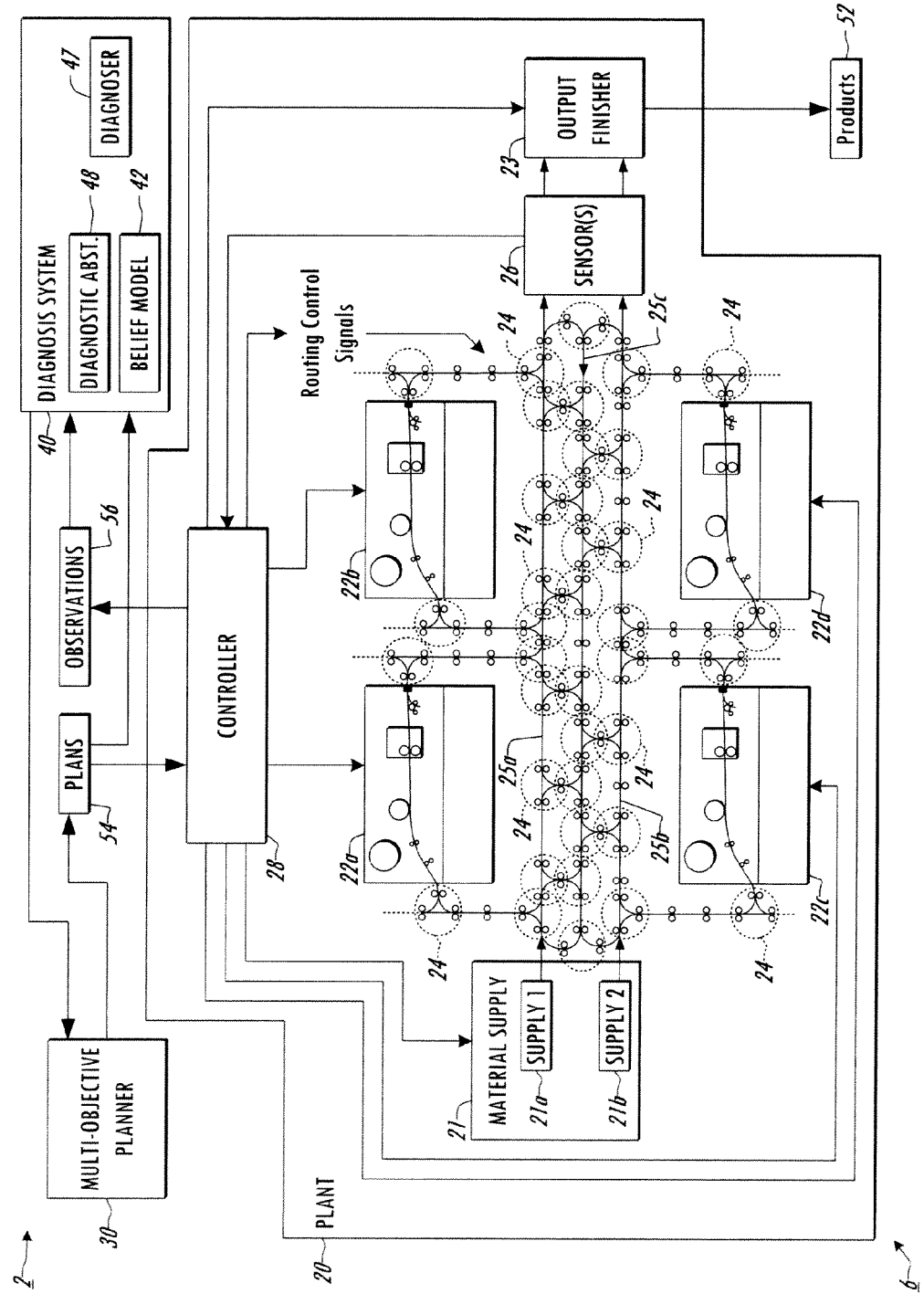
FIG. 2 is a schematic diagram illustrating further details of an exemplary modular printing system plant in the production system of FIG. 1.
Figure 3:
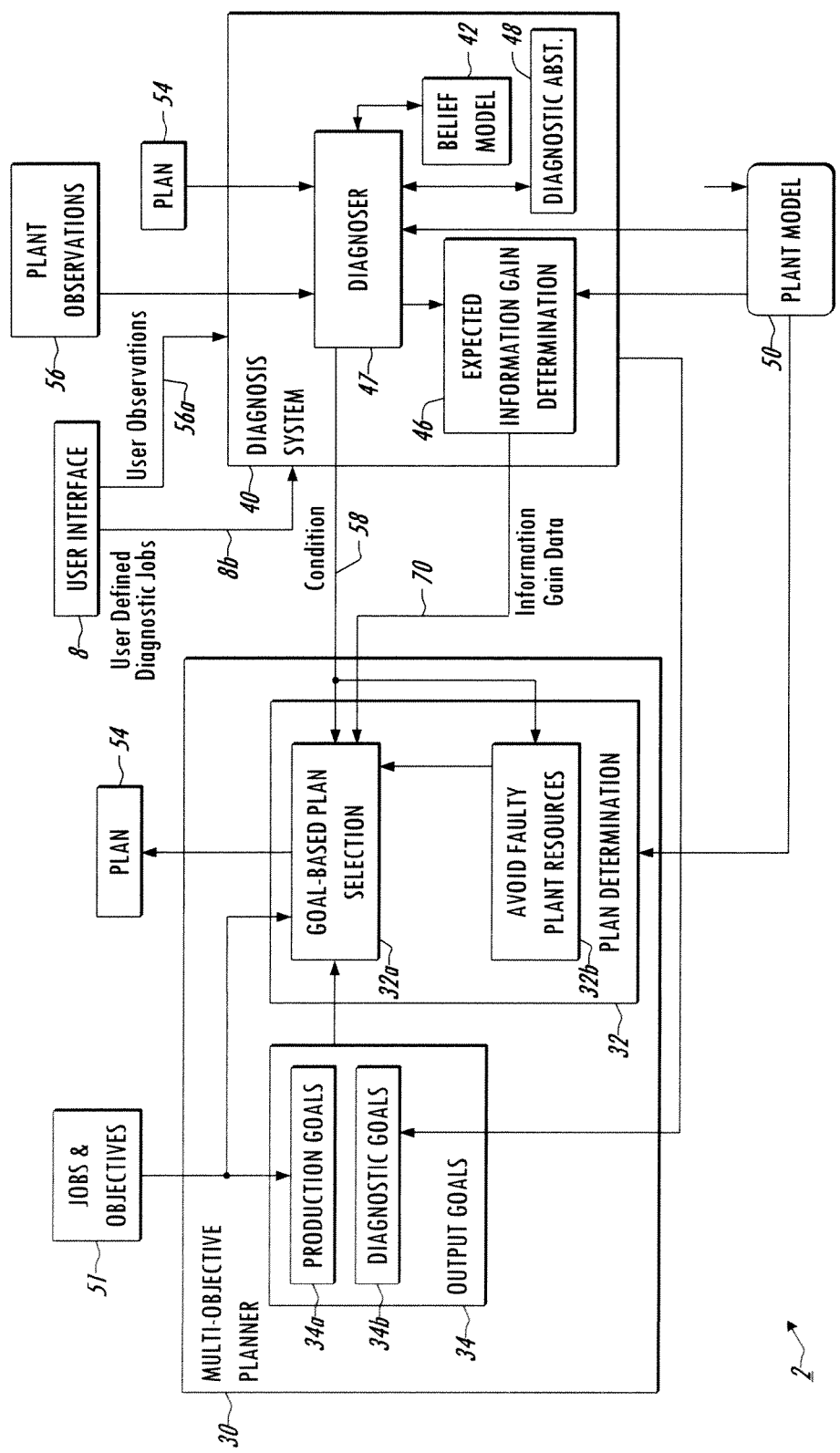
FIG. 3 is a schematic diagram illustrating further details of the exemplary planner and diagnosis system of FIGS. 1 and 2.

An exemplary system 1 is depicted in FIGS. 1-3 which includes a controller 2 with a diagnosis system 40 in accordance with various aspects of the present disclosure. FIG. 1 shows an exemplary production system 6 including a producer component 10 that receives production jobs 49 from a customer 4, as well as a plant 20 comprising a plurality of resources 21-24 that may be actuated or operated according to one or more plans 54 so as to produce one or more products 52 for provision to the customer 4 by the producer 10. The production of products can include modifying products, or objects, for example, packaging or wrapping products, transporting products, reorienting products, etc. FIG. 2 illustrates further details of one exemplary plant 20 and FIG. 3 shows additional details regarding the exemplary model-based control system 2 and the diagnosis system 40 thereof. The producer 10 manages one or more plants 20 which produce the output products 52 to satisfy customer jobs 49. The producer 10 in this embodiment provides jobs and objectives 51 to a multi-objective planner 30 of the model-based control system 2 and the production system 6 receives plans 54 from the planner 30 for execution in the plant 20. The jobs 54 can include one or both of production and diagnostic goals. As shown in FIG. 1, the control system 2 further includes a plant model 50 with a model of the plant 20, and a diagnosis system 40 with a belief model 42. The diagnosis system 40 determines and updates a current plant condition 58 using a diagnoser 47 (FIGS. 1 and 3) based on one or more previously executed plans 54, corresponding observations 56 from the plant 20, and the model 50. The diagnosis system 40 also provides expected information gain data 70 to the planner 30 in the illustrated implementation for one or more possible plans 54 based on the current plant condition 58 and the model 50, although the intelligent plan selection aspects of the illustrated control system 2 are not strict requirements of the present disclosure.

The model-based control system 2 and the diagnostic, planning, and model components thereof may be implemented as hardware, software, firmware, programmable logic, or combinations thereof, and may be implemented in unitary or distributed fashion. In one possible implementation, the planner 30, the diagnosis system 40, and the model 50 are software components and may be implemented as a set of sub-components or objects including computer executable instructions and computer readable data executing on one or more hardware platforms such as one or more computers including one or more processors, data stores, memory, etc. The components 30, 40, and 50 and sub components thereof may be executed on the same computer or in distributed fashion in two or more processing components that are operatively coupled with one another to provide the functionality and operation described herein. Likewise, the producer 10 may be implemented in any suitable hardware, software, firmware, logic, or combinations thereof, in a single system component or in distributed fashion in multiple interoperable components. In this regard, the control system 2 may be implemented using modular software components (e.g., the model 50, the planner 30, the diagnosis system 40 and/or sub-components thereof) to facilitate ease of debugging and testing, the ability to plug state of the art modules into any role, and distribution of operation over multiple servers, computers, hardware components, etc. The embodiment of FIG. 1 also includes an optional operator interface 8 implemented in the computer or other platform(s) on which the other components of the control system 2 are implemented, although not a strict requirement of the disclosure, wherein the operator interface 8 may alternatively be a separate system operatively coupled with the control system 2. The exemplary operator interface 8 is operatively coupled with the diagnosis system 40 to provide operator observations 56a to the diagnosis system 40, and the interface 8 allows the operator to define a diagnostic job 8b using a diagnosis job description language 8a, where the diagnosis system 40 may provide diagnostic jobs 60 to the producer 10. The diagnosis system 40 in this implementation is operative to selectively provide one or more self-generated diagnostic jobs 60 and/or operator defined diagnostic jobs 8b to the producer 10, which in turn provides jobs and objectives 51 to the planner 30.

The planner 30 provides one or more plans 54 to the production system 6 for execution in the plant 20 based on at least one output objective 34 (FIG. 3) and production goals as directed by the incoming jobs 51 from the producer 10. As shown in FIG. 3, the planner 30 selectively factors in one or more output objectives 34 derived from the jobs and objectives 51 in constructing plans 54, including production objectives 34a and diagnostic objectives 34b. In one possible implementation, the production objectives 34a are created and updated according to the jobs and objectives 51 obtained from the production system 6, and the diagnostic objectives 34b are derived from and updated according to the current plant condition 58 and the expected information gain data 70 provided by the diagnosis system 40. The production objectives 34a in one implementation may relate to the scheduling of orders for produced products 52 (FIG. 1), and may include prioritization of production, minimization of inventory, and other considerations and constraints driven in large part by cost and customer needs. Examples of production objectives 34a include prioritizing plan construction/generation with respect to achieving a given product output goal (simple production criteria) as well as a secondary consideration such as simple time efficient production, cost efficient production, and robust production. For instance, cost efficient production objectives 34a will lead to construction/generation of plans 54 that are the most cost efficient among the plans that met the production goal as dictated by the jobs 51 received from the producer 10. The diagnostic objectives 34b may include objectives related to determining preferred action sequences in generated plans 54 for performing a given production-related task, minimization of maintenance and repair costs in operation of the plant 20, identifying resources 21-24 causing intermittent or persistent faults, etc. In operation, the planner 30 creates and provides plans 54 for execution in the plant 20. The plans 54 include a series of actions to facilitate one or more production and/or diagnostic objectives 34 while achieving a production goal according to the jobs 51, where a given action may appear more than once in a given plan. The actions are taken with respect to states and resources 21-24 defined in the model 50 of the plant 20, for example, to route a given substrate through a modular printing system 20 from a starting state to a finished state as shown in FIG. 2. In operation, the planner 30 generates or constructs a plan 54 that will achieve a given production goal at least partially based on a diagnostic objective 34b and the expected information gain data 70 from the diagnosis system 40. The planner 30 in the illustrated embodiment includes a goal-based plan construction component 32 that assesses the current plant condition 58 from the diagnosis system 40 in generating a plan 54 for execution in the plant 20. The component 32 may also facilitate identification of faulty components 21-24 or sets thereof in constructing the plans 54 based on observations 56 and current plant conditions 58 indicating one or more plant components 21-24 as being suspected of causing system faults.

The exemplary diagnosis system 40 includes a belief model 42 representing the current state of the plant 20, and a diagnoser 47 that provides the current condition 58 of the plant 20 to the planner 30 based on the previously executed plan(s) 54 and corresponding plant observations 56. The diagnoser 47 also estimates and updates the plant condition of the belief model 42 according to the plant observations 56, the plant model 50, and the previously executed plans 54. The operator observations 56a from the interface 8 may also be used to supplement the estimation and updating of the current plant condition by the diagnoser 47. The diagnoser 47 provides the condition information 58 to inform the planner 30 of the confirmed or suspected condition of one or more resources 21-24 or other components of the plant 20 (FIG. 1). This condition information 58 may be considered by the plan construction component 32, together with information about the plant 20 from the plant model 50 in providing plans 54 for implementing a given production job or goal 51, in consideration of production objectives 34a and diagnostic objectives 34b. The diagnosis system 40 also includes a component 46 that provides expected information gain data 70 to the planner 30 based on the model 50 and the belief model 42. The information gain data 70 may optionally be determined in consideration of the operator defined diagnostic jobs 8b from the operator interface 8. In one embodiment, the belief model 42 (FIG. 1) comprises a list 42a of good or exonerated resources of the plant 20, a list 42b of bad or suspected resources of the plant 20, and a list 42c of unknown resources of the plant 20 (e.g., FIGS. 7, 11, 14, and 5 below). In another aspect of the disclosure, the belief model 42 indicates a fault probability for at least one resource 21-24 of the plant 20.

FIG. 2 illustrates further details of an exemplary modular printing system plant 20 in the production system 6, including a material supply component 21 that provides printable sheet substrates from one of two supply sources 21a and 21b, a plurality of print or marking engines 22, an output finisher station 23, a modular substrate transport system including a plurality of bidirectional substrate transport/router components 24 (depicted in dashed circles in FIG. 2), one or more output sensors 26 disposed between the transport system 24 and the finisher 23, and a controller 28 providing control signals for operating the various actuator resources 21-24 of the plant 20. The exemplary printing system plant 20 includes four print engines 22a, 22b, 22c, and 22d, although any number of such marking engines may be included, and further provides a multi-path transport highway with three bidirectional substrate transport paths 25a, 25b, and 25c, with the transport components 24 being operable by suitable routing signals from the controller 28 to transport individual substrate sheets from the supply 21 through one or more of the marking engines 22 (with or without inversion for duplex two-side printing), and ultimately to the output finishing station 23 where given print jobs are provided as output products 52. Each of the printing engines 22, moreover, may individually provide for local duplex routing and media inversion, and may be single color or multi-color printing engines operable via signals from the controller 28. The model-based control system 2 may, in certain embodiments, be integrated into the plant controller 28, although not a strict requirement of the present disclosure.

Referring now to FIGS. 1-3, in operation, the exemplary planner 30 automatically generates plans 54 representing a series of actions for component resources 21-24 of the printing system plant 20 derived from the incoming jobs 51 in consideration of one or more production objectives 34a and diagnostic objectives 34b. In particular, when the plant 20 has flexibility in how the output goals can be achieved (e.g., in how the desired products 52 can be created, modified, packaged, wrapped, moved, reoriented, etc.), such as when two or more possible plans 54 can be used to produce the desired products 52, the diagnosis system 40 can alter or influence the plan construction operation of the planner 30 to generate a plan 54 that is expected to yield the most informative observations 56. The constructed plan 54 in this respect may or may not compromise short term production objectives 34a (e.g., increases job time or slightly lowers quality), but production nevertheless need not be halted in order for the system to learn. The additional information gained from execution of the constructed job 54 can be used by the producer 10 and/or by the planner 30 and diagnosis system 40 to work around faulty component resources 21-24, to schedule effective repair/maintenance, and/or to further diagnose the system state (e.g., to confirm or rule out certain system resources 21-24 as the source of faults previously detected by the sensor(s) 26). In this manner, the information gleaned from the constructed plans 54 (e.g., plant observations 56) can be used by the diagnoser 47 to further refine the accuracy of the current belief model 42.

Figure 5:
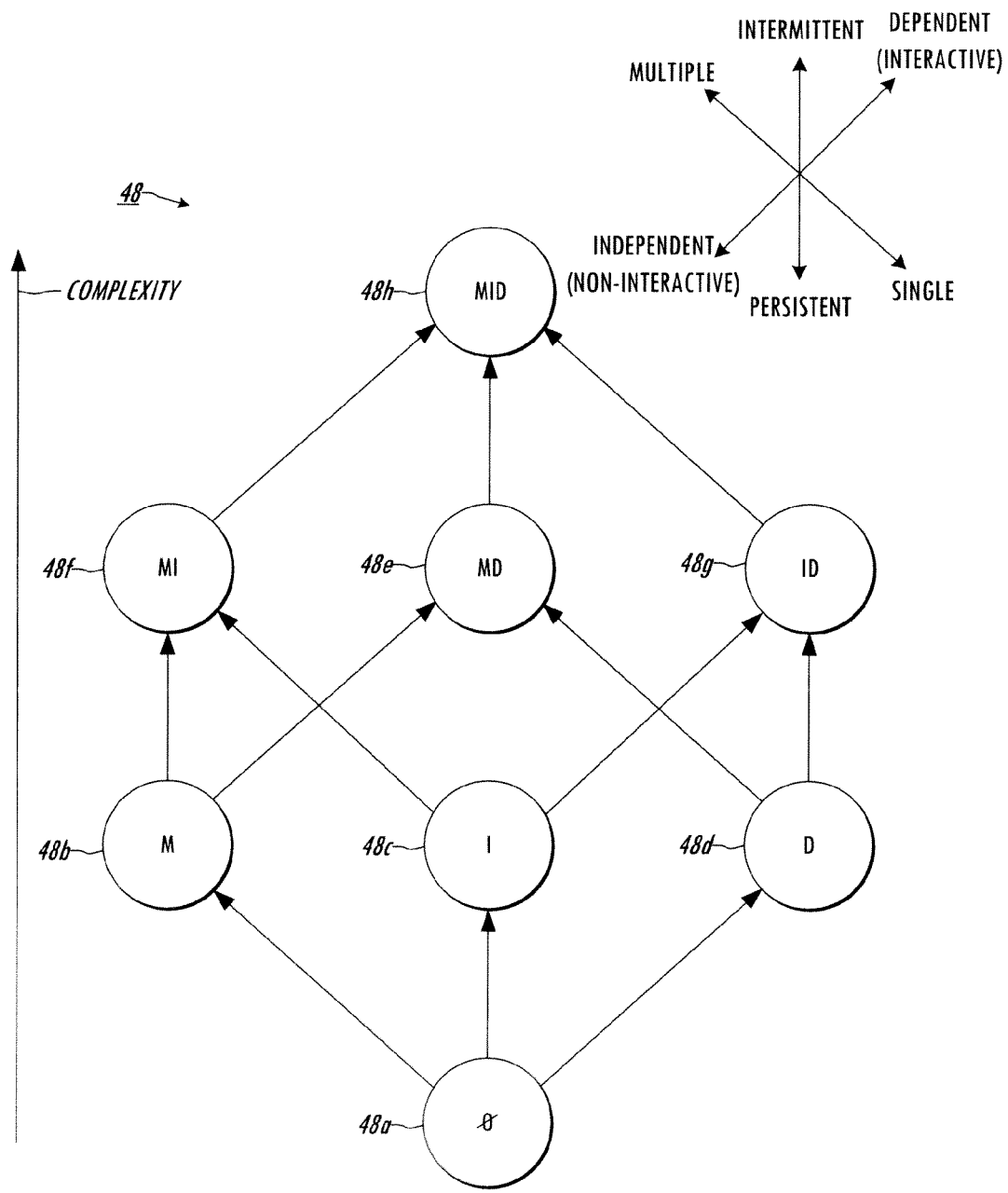
FIG. 5 is a schematic diagram illustrating an exemplary meta-diagnosis lattice structure representing resource fault assumptions of varying complexities in accordance with various aspects of the present disclosure.
Figure 8:
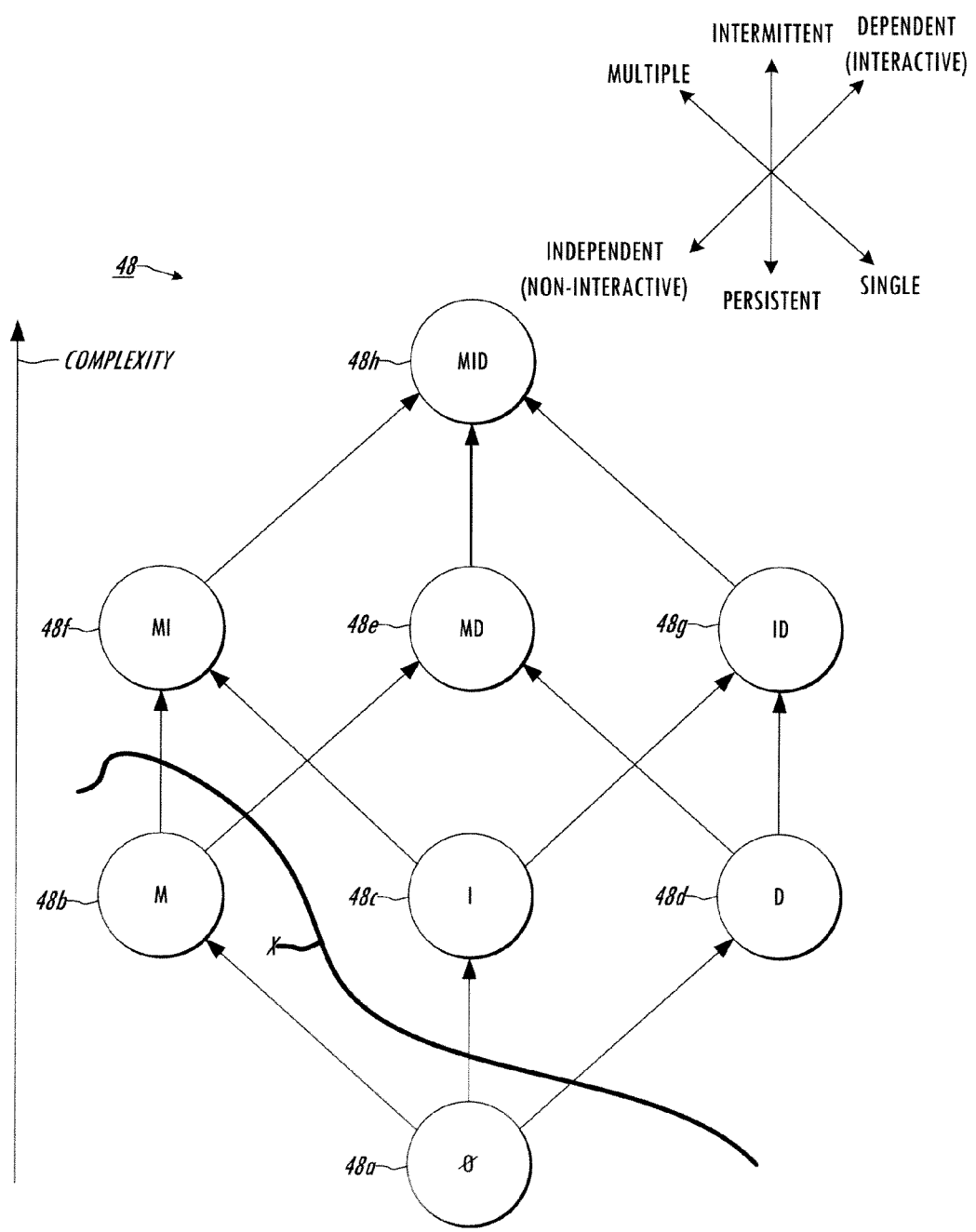
FIG. 8 is a schematic diagram illustrating the meta-diagnosis lattice structure of FIG. 5 including a line representing a lower bound of fault assumption complexity after identification of a meta-conflict for non-interaction persistent faults in accordance with various aspects of the present disclosure.

Referring particularly to FIGS. 1, 3, 5, and 9, the diagnosis system 40 is comprised of a plurality of diagnostic abstractions 48 that individually represent one or more fault assumptions regarding the plant resources 21-24. The complexities of the fault assumption or assumptions of each diagnostic abstraction 48, moreover, are different. FIGS. 5 and 8 illustrate an exemplary meta-diagnosis lattice structure representing resource fault abstractions 48a-48h with assumptions of varying complexities in accordance with various aspects of the present disclosure. In this example, the abstractions 48 include abstractions 48a, 48c, 48d, and 48g representing a single fault assumption and abstractions 28b, 48e, 48f, and 48h representing a multiple fault assumption ("M" in FIGS. 5 and 8) regarding the plant resources 21-24, where the single fault assumptions are less complex than the multiple fault assumptions. Moreover, this exemplary set of abstractions 48 includes abstractions 48a, 48b, 48d, and 48e representing a persistent fault assumption and abstractions 48c, 48f, 48g, and 48h representing an intermittent fault assumption ("I" in FIGS. 5 and 8) regarding the plant resources 21-24, with the intermittent fault assumptions being more complex than the persistent fault assumptions. The set 48 also provides abstractions 48d, 48e, 48g, and 48h representing an interaction fault assumption ("D" in FIGS. 5 and 8) and abstractions 48 representing a non-interaction fault assumption, with the former representing more complex assumptions. The abstractions 48 in this example are of different complexities, and are used by the diagnosis system 40 in successive order from simplest to most complex to determine the current condition of the plant 20 (diagnosis) 58.

Figure 9:
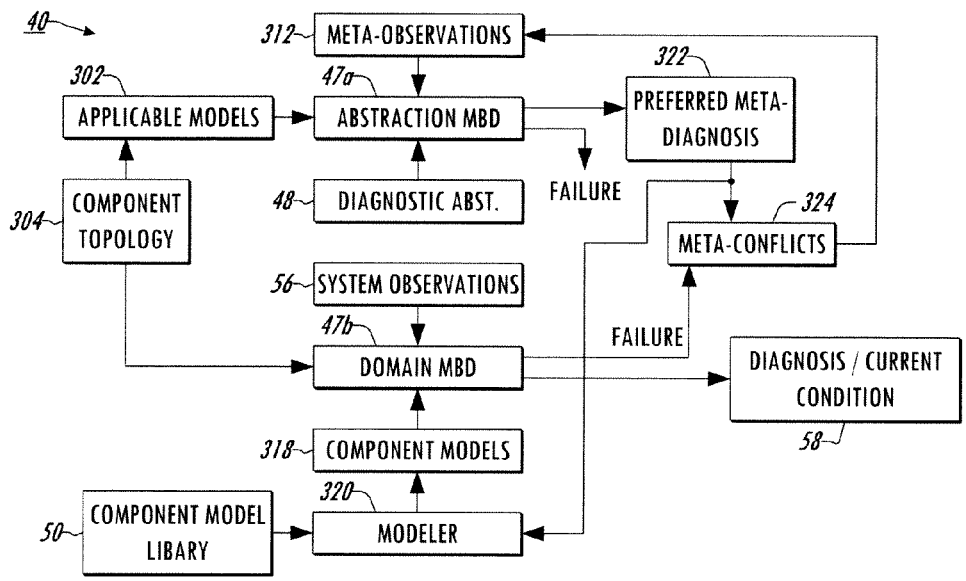
FIG. 9 is a partial schematic diagram illustrating further details of the diagnosis system in the controller of FIGS. 1-3.

As best shown in FIGS. 1, 3, and 9, the diagnosis system 40 includes a diagnoser 47 having diagnosis components 47a and 47b for diagnosing the abstractions 48 and system components (domain), respectively. The diagnoser 47 thus provides two levels of diagnosis, one at the domain level via the domain model based diagnosis (MBD) component 47b to identify the concrete faulty components or resources 21-24, and the other at the abstraction level using the abstraction MBD component 47a to identify the best way to model the system manifesting the symptom, thereby performing a diagnosis with respect to the domain level diagnostic assumptions of the abstractions 48 themselves. By abstracting from the detailed properties of a system 20, the novel abstraction MBD component 47a is operative to identify and select the abstraction 48 that is as simple as possible yet sufficient to address the task at hand. The approach chooses the desired abstraction level through applying model-based diagnosis at the meta-level, i.e., to the abstraction assumptions of the abstractions 48 themselves. In operation, the abstraction diagnosis component 47a initially selects a first one of the abstractions 48 having the least complex fault assumption or assumptions. The domain diagnosis component 47b uses this to determine the current plant condition (domain diagnosis) 58 and to update the belief model 42 based at least partially on the currently selected diagnostic abstraction 48, a previously executed plan 54, at least one corresponding observation 56 from the plant 20, and the plant model 50. When most recently selected diagnostic abstraction 48 is logically inconsistent with the current fault status indications 42a-42c in the belief model 42, the abstraction diagnosis component 47a selects another one of the diagnostic abstractions 48 having more complex fault assumptions. Thus, the system 40 operates to adapt the fault assumptions as needed to ensure that the current plant condition/diagnosis 58 is consistent with the observed plant behavior resulting from previously executed plans 54. Moreover, the exemplary domain diagnosis component 47*b* is operative to identify at least one interaction fault involving interaction of two or more resources 21-24 of the plant 20.

Figure 4:
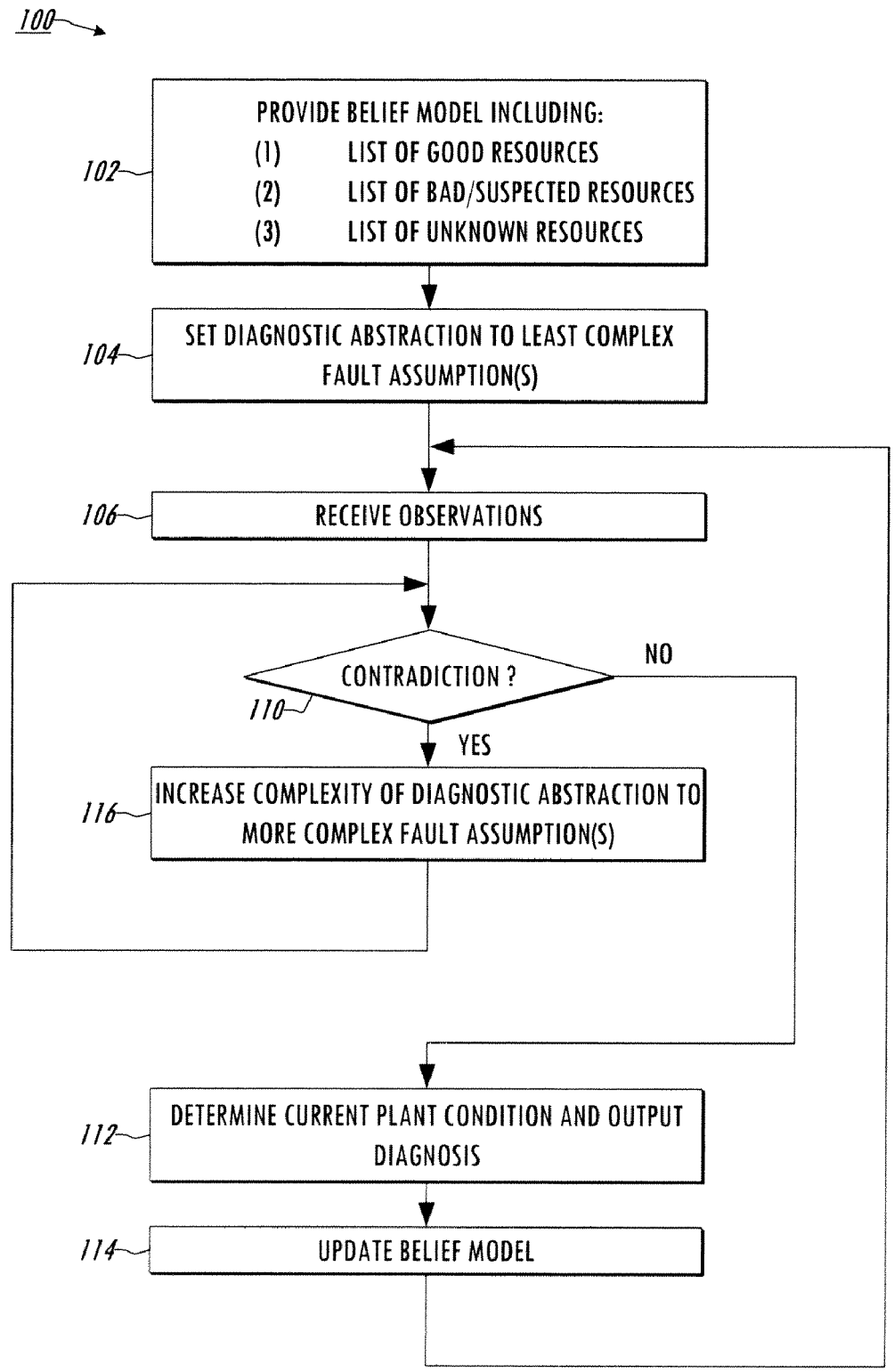
FIG. 4 is a flow diagram illustrating an exemplary method for determining a current production plant condition using adaptive diagnostic assumptions in accordance with further aspects of the disclosure.

Referring also to FIG. 4, an exemplary method 100 is illustrated for determining a current condition 58 of the plant resources 21-24. Although the method 100 is illustrated and described below in the form of a series of acts or events, it will be appreciated that the various methods of the disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods 200 and 300 of the disclosure may be implemented in hardware, software, or combinations thereof, such as in the exemplary control system 2 described above, and may be embodied in the form of computer executable instructions stored in a computer readable medium, such as in a memory operatively associated with the control system 2 in one example.

The method 100 begins at 102 with provision of a belief model (e.g., model 42 above) that includes a list 42*a* of good or exonerated resources of the plant 20, a list 42*b* of bad or suspected resources of the plant 20, and a list 42*c* of unknown resources of the plant 20. The method 100 continues at 104 with selection of a first one of a plurality of diagnostic abstractions 48 having the least complex fault assumption or assumptions regarding the plant resources 21-24. For example, in the illustrated diagnoser 47, the abstract MBD component 47*a* initially assumes the simplest case for single, persistent, non-interaction faults, and accordingly selects the abstraction 48*a* in FIGS. 5 and 8. Plant observations 56 are received at 106 in FIG. 4, and a determination is made at 110 as to whether a contradiction exists between the currently selected diagnostic abstraction 48 and the current fault status indications 42*a*-42*c* derived from the past history and the received observations 106. If not (NO at 110), the process 100 proceeds to 112 where the current plant condition (domain diagnosis 58) is determined based at least partially on the currently selected diagnostic abstraction 48, a previously executed plan 54, at least one corresponding observation 56 from the plant 20, and a plant model 50. The diagnosis 58 is output, for instance to the planner 30, and the belief model 42 is updated at 114 before returning to get more observations at 106.

If, however, the most recently selected diagnostic abstraction 48 is logically inconsistent with the current fault status indications 42*a*-42*c* (YES at 110), the another one of the diagnostic abstractions 48 is selected at 116 having more complex fault assumptions and the process returns to again test the veracity of this newly selected abstraction at 110. The diagnoser 47 thus infers the condition of internal components 21-24 of the plant 20 at least partially from information in the form or observations 56 derived from the limited sensors 26, wherein the diagnosis system 40 constructs the plant condition 58 in one embodiment to indicate both the condition (e.g., normal, worn, broken) and the current operational state (e.g., on, off, occupied, empty, etc.) of the individual resources 21-24 or components of the plant 20, and the belief model 42 can be updated accordingly to indicate confidence in the conditions and/or states of the resources or components 21-24. The model in one embodiment provides lists 42*a*-42*c* of good, bad, and suspected resources 21-24 and/or may include fault probability values for the resources 21-24.

In operation, once the producer 10 has initiated production of one or more plans 54, the diagnosis system 40 receives a copy of the executed plan(s) 54 and corresponding observations 56 (along with any operator-entered observations 56*a*). The diagnoser 47 uses the observations 56, 56*a* together with the plant model 50 to infer or estimate the condition 58 of internal components/resources 21-24 and updates the belief model 42 accordingly. The inferred plant condition information 58 is used by the planner 30 to directly improve the productivity of the system 20, such as by selectively constructing plans 54 that avoid using one or more resources/components 21-24 known (or believed with high probability) to be faulty, and/or the producer 10 may utilize the condition information 58 in scheduling jobs 51 to accomplish such avoidance of faulty resources 21-24. To improve future productivity, moreover, the diagnosis system 40 provides the data 70 to the planner 30 regarding the expected information gain of various possible production plans 54. The planner 30, in turn, can use this data 70 to construct production plans 54 that are maximally diagnostic (e.g., most likely to yield information of highest diagnostic value).

FIG. 9 illustrates further details of one implementation of the diagnosis system 40, in which the domain MBD component 47*b* generates either a diagnosis 58 or a conflict (FAILURE) indication for meta-conflicts 324 according to system observations 56 and component models 318 obtained from a modeler 320 according to the component model library of the plant model 50 and component topology information 304. The topology information 304 is also input into a series of applicable models 302 used by the abstraction MBD component 47*a* to generate preferred meta-diagnosis 322 or a failure indication based on meta-observations 312 from the identified conflicts 324 and the currently selected diagnostic abstraction 48.

Figures 6, 7:
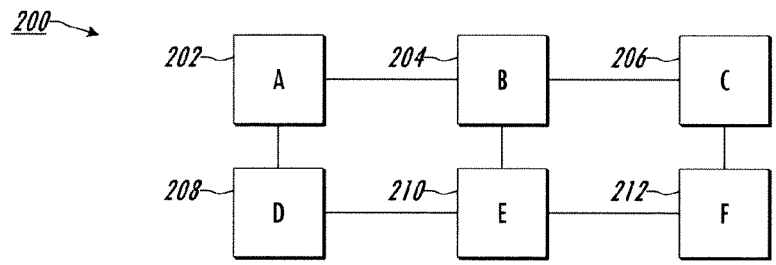
FIG. 6 is a schematic diagram illustrating a representative portion of a production system in simplified form.
FIG. 7 is a table illustrating exemplary executed plans and corresponding observations from the system of FIG. 6 along with the corresponding system diagnostic condition conclusions for a single persistent fault assumption.

Referring now to FIGS. 5-16, the operation of the exemplary diagnosis system 40 is described with respect to a simplified system 200 having resources or components A 202, B 204, C 206, D 208, E 210, and F 212 forming a production plant as shown in FIG. 6. In operation, the diagnosis system 40 is able to identify resource failures of a variety of types and combinations thereof, including single and/or multiple faults, interaction and/or non-interaction faults, as well as persistent and/or intermittent faults, where the various combinations of these are depicted in the abstractions 48*a*-48*h* of FIGS. 5 and 8. The ability to discern interaction faults is particularly advantageous for diagnosing certain production plants in which component A 202 operates correctly stand-alone, and component B 204 operates correctly stand-alone, and yet a failure is observed when these resources 202 and 204 both operate on the same product. Absent the ability to diagnose interaction faults, conventional model-based diagnosis apparatus would identify both components A and B as faulted, leading to unnecessary replacement of both components 202 and 204, although repair of only one may be needed to rectify the interaction fault.

The diagnosis system 40 of the present disclosure assesses the assumptions underlying the current abstraction 48 based on the observed plant behavior, initially selecting the simplest fault assumptions (e.g., single, non-interaction, persistent faults) to diagnose the system 200, and only when those assumptions yield a contradiction will a more complex abstraction 48 be selected. The meta-assumptions of the modeling abstraction itself are treated as assumptions in the model-based diagnosis component 47b, and the abstraction MBD component 47a selects one particular diagnosis abstraction 48 as the current abstraction level. In the illustrated diagnosis system 40, the abstraction MBD component 47a initially assumes single faults before multiple faults in selecting the first abstraction 48a. However, in many production plants, most faults are intermittent and difficult to isolate. The domain diagnosis component 47b is operative, when provided with an abstraction that contemplates intermittent faults (e.g., abstractions 48c, 48f, 48g, or 48h in FIGS. 5 and 8), to isolate intermittent faults by learning from past observations 56. Likewise, if provided with an abstraction that assumes interaction faults (e.g. abstraction 48d, 48e, 48g, or 48h), the domain diagnosis component 47b can identify sets of plant resources that fail together in an interactive manner.

In the example of FIG. 6, initially selecting abstraction 48a in FIG. 5 that assumes non-interaction, persistent, single faults, FIG. 7 illustrates a table 220 showing the diagnosis conclusions for three exemplary executed plans 54 and corresponding plant observations 56 in considering only components A 202, B 204, and C 206. Each plan 54 $p_i=[c_1, c_2, \ldots, c_n]$ is a sequence of components involved in the execution thereof in the plant. Plan 1 (A,B) fails in this example, and therefore the domain diagnosis component 47b concludes that resource C 206 is exonerated, and that components A 202 and B 204 remain suspected. Plan 2 (B,C) then executes successfully, thereby further exonerating B 204 and C 206. However, successful execution of Plan 3 (A) would then appear to also exonerate resource A 202, which is logically inconsistent with the previous failure of Plan 1 and the currently selected abstraction 48a. Upon detecting this meta-conflict, $AB_a(M) \vee AB_a(I) \vee AB_a(D)$, the abstraction diagnosis component 47a selects another abstraction 48 from the library having more complex failure assumptions. For example, in one possible implementation, the abstraction diagnosis component 47a then selects to now consider multiple faults, and thus selects the abstraction 48b in FIGS. 5 and 8. Using this, the successful execution of Plan 2 exonerates B 204 and C 206, but the success of Plan 3 exonerates A, and thus another meta-conflict $AB_a(I) \vee AB_a(D)$ is found by the abstraction diagnosis component 47a. At the abstraction level, therefore, FIG. 8 illustrates a line showing a lower bound of fault assumption complexity after identification of a meta-conflicts for single or multiple non-interaction persistent fault assumptions of the abstractions 48a and 48b (e.g., these abstractions are not robust enough to correctly diagnose the plant.

Based on this, the abstraction diagnosis component 47 determines that more complex fault assumptions are warranted, and thus assumes that the plant can contain either or both an intermittent fault and/or an interaction fault. For instance, it is possible that component A can be intermittently failing, producing a bad output at time 1 and a good output at time 3. The system can also contain an interaction fault. For example, the system can contain the interaction fault [A,B], where both components 202 and 204 might individually be working correctly, but produce faulty behavior when combined. In the following figures, [ . . . ] indicates an interaction fault which occurs only when all of the components operate on the same object. Plan 1 is the only plan in which resources A 202 and B 204 are both used, and thus the interaction fault [A,B] explains all the observations 56 from the plant.

In the illustrated diagnosis system 40, a tentative diagnosis 58 is represented by the set of failing components. When a plan 54 succeeds, the system 40 infers that if there are no intermittent faults ($\neg ABa(I)$), then every component mentioned in the plan is exonerated; and that if there are interaction faults ($ABa(D)$), then every diagnosis 58 containing an interaction fault which contains only components from the plan p is exonerated. In addition, the component 47a infers that when a plan p fails, every diagnosis 58 that does not contain a component in p is exonerated. Initially, all subsets of components 202-212 can be diagnoses 58. With the introduction of interaction faults, any combination of components 202-212 can also be a fault, and thus, if a plan includes an integer number "n" components or resources, there are $o(2^{2^n})$ possible diagnoses.

Figure 10:
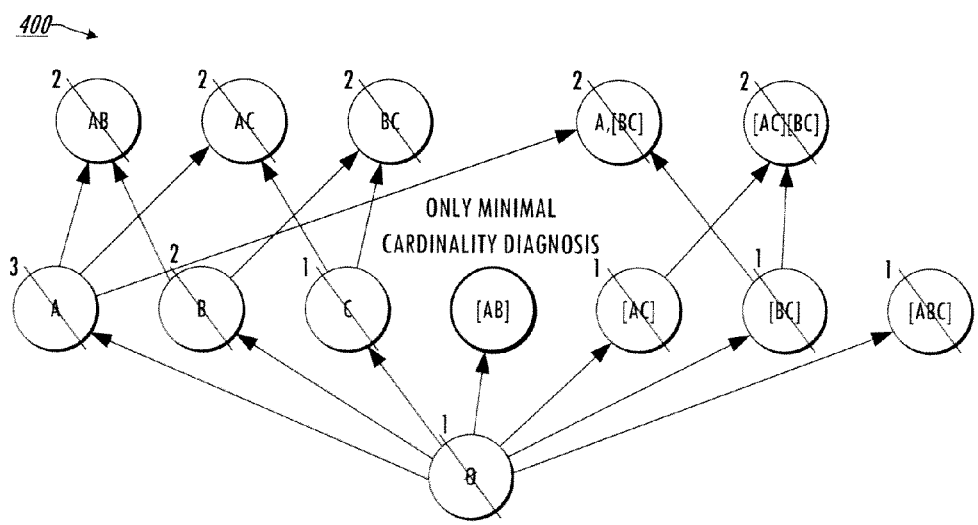
FIG. 10 is a schematic diagram illustrating another exemplary diagnosis lattice structure representing non-interaction and interaction faults in accordance with the present disclosure.

FIG. 10 illustrates a fraction of the diagnosis lattice 400 for a simple system with the three components {A,B,C} (components 202, 204, and 206 in FIG. 6). For simplicity, persistent faults are assumed, but multiple and interaction faults are allowed (e.g., the abstraction diagnosis component 47a selects abstraction 48e in FIGS. 5 and 8). Using the prior example, execution of Plan 1 which used A,B produced a failure. Using the assumptions of abstraction 48e, component C 206 alone cannot explain the observations 56, and neither can [AC], [BC] or [ABC]. The only minimum cardinality diagnoses are {A}, {B} and {[AB]}. The success of Plan 2 exonerates B and C. Therefore any diagnosis which contains B or C is exonerated. In addition, any diagnosis 58 containing the interaction fault [BC] is exonerated. Finally, when Plan 3 is observed to succeed, A is exonerated. The only minimum cardinality diagnosis which explains the symptoms is the interaction fault [AB] as shown in FIG. 10, where the numbers next to the eliminated diagnoses indicate which plan eliminated that diagnosis.

Exemplary diagnostic algorithms are described below with respect to operation of the diagnoser 47 in the system 40, which maintain mutually exclusive sets of diagnostic abstractions 48, good components 42a, bad or suspected components 42b, and unknown components 42c. Each diagnostic abstraction 48 represents a set within which we are sure there is a faulty component, and the system 40 explores one abstraction 48 at a time. In certain embodiments of the diagnosis system 40, moreover, the current abstraction 48 and the listings in the belief model 41 will represent the entire state of knowledge of the fault condition of the plant resources, where conflicts from prior observations 56 may be discarded. Because the plant 20 may be continuously operated, there may be far too many observations to record in detail. However, the described algorithms may take more observations to pinpoint the true fault(s), but it will never miss faults.

For a single fault abstraction (e.g., 48a in FIGS. 5 and 8), a system Sys is a tuple <C, P,Z> where C is the set of all plant resources 21-24, P is a list of plans 54 ($p_i=[c_1, c_2, \ldots, c_n]$ is a sequence of components involved in the plan 54), and Z is a list of observations 56, where an observation $z_i \in \{f,s\}$ is associated with plan $p_i$, and plan failures are denoted "f" and successful plan execution is denoted "s". A diagnosis D is a tuple <g, b, x, su> where $q \subset C$ is the set of good components, $b \subset C$ is the set of bad components, $x \subset C$ is the set of unknown components which are not under suspicion and not exonerated, and $su \subset C$ is the set of suspected components.

FIG. 12 shows a first algorithm 430 executed by the diagnoser 47 for each plan 54 and observation 56 pair. The algorithm 430 updates the entire state of knowledge of the faultedness of system components. As an illustrative example, Sys is assumed to be the six component system 200 in FIG. 6 with components C={A,B,C,D,E,F}, any combination of components can be executed in a given plan 54, and component B is faulted. Table 320 in FIG. 11 illustrates for each time step t the entire state of knowledge, in which every component is a member of exactly one of the sets of the current diagnosis 58. In the illustrated sequence of plans 54, Plan 1 (ABCDE) fails, and the diagnoser 47 focuses on the fact that one of {A,B,C, D,E} is faulted. Plan 2 (ABC) fails, and the domain diagnosis component 47b can narrow the focus to the fact that one of {A,B,C} is faulted, and knows that {D,E} are good. Plan 3 (ADE) succeeds, and accordingly A,D,E are exonerated and the focus narrows to {B,C}. Plan 4 (ABDE) fails, and since the failed Plan 4 intersects only in B with the suspected set, B must be faulted under the initial single fault assumption of abstraction 48a, and all other components are exonerated.

Referring to FIGS. 13 and 14, in a case where the abstraction diagnosis component 47a selects an abstraction 48 that assumes multiple faults are possible (e.g., abstraction 48b in FIGS. 5 and 8), a diagnosis 58 D is a tuple <g, b, x,DF> where $g \subseteq C$ is the set of good components, $b \subseteq C$ is the set of bad components, $x \subseteq C$ is the set of unknown components which are not under suspicion, DF is the set of diagnosis foci with a diagnosis focus $df_i$ being a tuple $<su_i, sc_i>$ where: $su_i \subseteq C$ is the set of suspected components in the diagnosis focus $df_i$ at time t, $sc_i \subseteq C$ is a set of components, and $su_i \cup sc_i$ is the set of components which defines the scope of the diagnosis focus $df_i$. Algorithm 440 in FIG. 13 is performed by the diagnoser 47 for each plan 54 and observation 58 pair to update the entire state of knowledge of the faultedness of system components. Assuming that Sys is a simple system with five components C={A,B,C,D,E}, that we are able to execute any combination of components as a plan 54, and that components B and D are faulted. Table 450 in FIG. 14 shows the entire state of knowledge for each time step t for this multiple fault abstraction 48b. Every component will be a member of exactly one of the sets of the current diagnosis 58. As shown in table 450 of FIG. 14, Plan 1 (ABCDE) fails, and the diagnoser 47 focuses on the fact that one of {A,B,C,D,E} is faulted. Plan 2 (ABC) also fails, and the focus is narrowed to the fact that one of {A,B,C} is faulted, with {D,E} remaining unknown. Plan 3 (ADE) fails and the focus narrows to A, while there may be a fault in {B,C} (But the scope is still {A,B,C}). Plan 4 (A) then succeeds, A is exonerated, and the focus moves to {B,C}. Plan 5 (ADE) fails, and since A was previously exonerated, the focus shifts to one of {D,E}. Plan 6 (AC) succeeds and therefore C is exonerated, by which the diagnosis component 47b concludes that B is faulted and this diagnosis 58 is output. This closes focus 1. Plan 7 (ADC) then fails, and given that A,C are exonerated, D is determined to be faulted, thus closing focus 2 and move the remaining components (e.g., E in this example) to the unknown set. Plan 8 (ACE) then succeeds, and thus ACE is exonerated.

FIGS. 15 and 16 illustrate a multiple interaction faults case where the abstraction diagnosis component 47a selects the abstraction 48e in FIGS. 5 and 8. In this case, $X=\{x_1, \ldots, x_n\}$ is a set of elements, P(X) is the power set over X (e.g., $X=\{x_1,x_2\} \leftrightarrow P(X)=\{\{\ \},\{x_1\},\{x_2\},\{x_1,x_2\}\}$), and $\overline{X} \equiv P(X)$ represents the power set of X. In this case, moreover:

$$\{\overline{Y}\} \sqcup \{X\} \equiv \begin{cases} \{\overline{Y}\}: & \text{if } X \subseteq Y \\ \{\overline{X}\}: & \text{if } Y \subseteq X \\ \{\overline{Y}, \overline{X}\}: & \text{otherwise,} \end{cases}$$

$\overline{P}(X) \equiv \cup_{Y \subset X} \overline{Y}$ is the set of all power sets over all possible subsets of X, and E(PX) is the set of all individual components mentioned in X, e.g. $X=\{\{a,b,c\},\{a,d,e\},\{g\}\} \leftrightarrow E(X)=\{a,b,c,d,e,g\}$. A system Sys is a tuple <C, P,Z> as defined in the single fault case. A diagnosis 58 D is a tuple <g, b, x, DF>. $g \subseteq \overline{P}(C)$ represents all global good diagnosis candidates where a diagnosis candidate is a set of components that can cause a failure. Let $X \subset C$ be a set of components, then $\overline{X} \in \overline{P}(C)$ represents all diagnosis candidates $dc \in P(X)$. $b \subseteq \overline{P}(C)$ is the set of bad diagnosis candidates, where {A, [DE]} denotes that A and the diagnosis candidate [DE] (interaction fault) are bad. $x \subseteq \overline{P}(C)$ is the set of unknown diagnosis candidates which are not under suspicion. DF is the set of diagnosis foci. A diagnosis focus $df_i$ is a tuple $<su_i, sc_i>$ where $su_i \subseteq \overline{P}(C)$ is the set of suspected diagnosis candidates in the diagnosis focus $df_i$ at time t, $sc_i \subseteq \overline{P}(C)$ is a set of diagnosis candidates. $su_i \cup sc_i$ is the set of diagnosis candidates which defines the scope of the diagnosis focus $df_i$, and $lg_i \subseteq \overline{P}(C)$ represents all local (relevant) good diagnosis candidates.

FIG. 16 illustrates a multiple interaction fault algorithm 470 implemented by the diagnoser 47 for a corresponding selected abstraction (e.g., abstraction 48e in FIGS. 5 and 8), and FIG. 15 illustrates a table 460 showing the entire state of knowledge of the faultedness of system components for this example. Assuming that Sys is a simple system with five components C={A,B,C,D,E}, that any combination of components may be executed as a plan 54, and that components B and D are faulted, FIG. 15 shows an exemplary sequence of plans 54 and the corresponding observed plant behavior along with the maintained lists of good, bad/suspected, and unknown components. In this example, Plan 1 (ABCDE) fails, and the diagnoser 47 focuses on the fact that one of {A,B,C,D,E} is faulted. Plan 2 (ABC) fails, and thus the diagnoser 47 narrows the focus to the fact that one of {A,B,C} is faulted, and components {D,E} are listed as unknown. Plan 3 (ADE) fails, and the focus narrows to A, while there may be a fault in {B,C} (But the scope is still {A,B,C}). Plan 4 (A) succeeds, A is exonerated, and the focus shifts to {B,C}, with A retained as a local (relevant) good ($\{\overline{A}\}$). Plan 5 (ADE) then fails, and since A is exonerated, a new focus is introduced on {D,E}, but the diagnoser 47 still keeps A as a local (relevant) good ($\{\overline{A}\}$). Plan 6 (AC) then succeeds, whereby A,C,[AC] are exonerated, denoted as $\overline{AC}$. The new global goods are $\{\overline{AC}\}$, because $\{\overline{A}\} \sqcup \{\overline{AC}\} = \{\overline{AC}\}$. The diagnoser 47 updates the local (relevant) goods in focus 1 to AC, because A,C,AC are relevant to focus 1, and component B is the only diagnosis candidate left in focus 1. Plan 7 (ADC) then fails. Given that A,C are exonerated, D is determined to be faulted because it is a minimal diagnosis candidate, and the diagnoser 47 accordingly closes focus 2. Plan 8 (ACE) then succeeds, by which A,C,E,AC,AE,CE,ACE are exonerated, denoted as $\overline{ACE}$. The new global goods are $\{\overline{ACE}\}$, because $\{\overline{AC}\} \sqcup \{\overline{ACE}\} = \{\overline{ACE}\}$. Plan 9 (B) then succeeds, thus exonerating B, denoted as $\overline{B}$. The new global goods are $\{\overline{ACE}, \overline{B}\}$, because $\{\overline{ACE}\} \sqcup \{\overline{B}\} = \{\overline{ACE}, \overline{B}\}$. At this point, the diagnosis candidates A,B,C,AC relevant to focus 1 are goods, and the diagnoser 47 therefore generates all minimal diagnosis candidates form the local goods {[AB], [BC]} and moves the focus to them. Plan 10 (AB) then fails, and since A,B were previously exonerated, the interaction set [AB] is faulted because it is a minimal diagnosis candidate.

In accordance with further aspects of the present disclosure, a computer readable medium is provided, which has computer executable instructions for instructions for selecting a first one of a plurality of diagnostic abstractions having the least complex fault assumption or assumptions regarding resources of a production plant, determining a current plant condition based at least partially on the currently selected diagnostic abstraction, a previously executed plan and corresponding observations from the plant, and a plant model, as well as instructions for selectively selecting another one of the diagnostic abstractions having more complex fault assumptions when a most recently selected diagnostic abstraction is logically inconsistent with the current fault status indications. The medium in certain embodiments also includes computer executable instructions for maintaining a belief model comprising at least one fault status indication for at least one resource of the plant, and updating the belief model based at least partially on the currently selected diagnostic abstraction, a previously executed plan, at least one corresponding observation from the plant, and the plant model.

The above examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

The invention claimed is:

1. A control system for controlling operation of a production system with a plant that achieves one or more production goals, the control system comprising:
   at least one processor; an electronic memory operatively coupled with the at least one processor;
   a planner implemented using the at least one processor, and operative to provide plans for execution using one or more plant resources in the plant; a model of the plant; and a diagnosis system comprising:
      a plurality of diagnostic abstractions stored in the electronic memory and individually representing one or more fault assumptions regarding resources of the plant with a complexity of the fault assumption or assumptions of each diagnostic abstraction being different, the plurality of diagnostic abstractions includes at least one abstraction representing a persistent fault assumption and at least one abstraction representing an intermittent fault assumption regarding resources of the plant with successively more complex fault assumptions, respectively;
      a belief model comprising at least one fault status indication for at least one resource of the plant, a list of good or exonerated resources of the plant, a list of bad or suspected resources of the plant, and a list of unknown resources of the plant; and
      a diagnoser including:
         an abstraction diagnosis component implemented using the at least one processor, and operative to initially select a first one of the plurality of diagnostic abstractions having the least complex fault assumption or assumptions and to subsequently select another one of the diagnostic abstractions having more complex fault assumptions when a most recently selected diagnostic abstraction is logically inconsistent with the current fault status indications in the belief model, a domain diagnosis component implemented using the at least one processor, and operative to determine a current plant condition and to update the belief model based at least partially on the currently selected diagnostic abstraction, a previously executed plan, at least one corresponding observation from the plant, and the plant model; and
      said planner generating at least one plan to schedule jobs to improve productivity based on said belief model to avoid using one or more resources known, or believed with high probability, to be faulty.

2. The control system of claim 1, wherein the plurality of diagnostic abstractions includes at least one abstraction representing a single fault assumption and at least one abstraction representing a multiple fault assumption regarding resources of the plant with successively more complex fault assumptions, respectively.

3. The control system of claim 2, wherein the plurality of diagnostic abstractions includes at least one abstraction representing an interaction fault assumption and at least one abstraction representing a non-interaction fault assumption regarding resources of the plant with successively more complex fault assumptions, respectively.

4. The control system of claim 1, wherein the plurality of diagnostic abstractions includes at least one abstraction representing an interaction fault assumption and at least one abstraction representing a non-interaction fault assumption regarding resources of the plant with successively more complex fault assumptions, respectively.

5. The control system of claim 4, wherein the domain diagnosis component is operative to identify at least one interaction fault involving interaction of two or more resources of the plant.

6. The control system of claim 1, wherein at least one fault status indication in the belief model indicates a fault probability for at least one resource of the plant.

7. A method of determining a current condition of resources of a production plant, the method comprising:
   storing in electronic memory, a plurality of diagnostic abstractions individually representing one or more fault assumptions regarding resources of the plant with a complexity of the fault assumption or assumptions of each diagnostic abstraction being different, the plurality of diagnostic abstractions includes at least one abstraction representing a persistent fault assumption and at least one abstraction representing an intermittent fault assumption regarding resources of the plant with successively more complex fault assumptions, respectively;
   selecting a first one of the plurality of diagnostic abstractions having the least complex fault assumption or assumptions regarding resources of the plant;
   determining a current plant condition based at least partially on the currently selected diagnostic abstraction, a previously executed plan, at least one corresponding observation from the plant, and a plant model;

selectively selecting another one of the diagnostic abstractions having more complex fault assumptions when a most recently selected diagnostic abstraction is logically inconsistent with the current fault status indications;

maintaining a belief model in the electronic memory, the belief model comprising at least one fault status indication for at least one resource of the plant, a list of good or exonerated resources of the plant, a list of bad or suspected resources of the plant, and a list of unknown resources of the plant;

updating the belief model based at least partially on the currently selected diagnostic abstraction, a previously executed plan, at least one corresponding observation from the plant, and the plant model; and generating at least one plan to schedule jobs to improve productivity based on said belief model to avoid using one or more resources known, or believed with high probability, to be faulty.

8. The method of claim 7, wherein the plurality of diagnostic abstractions includes at least one abstraction representing a single fault assumption and at least one abstraction representing a multiple fault assumption regarding resources of the plant with successively more complex fault assumptions, respectively.

9. The method of claim 7, wherein the plurality of diagnostic abstractions includes at least one abstraction representing a persistent fault assumption and at least one abstraction representing an intermittent fault assumption regarding resources of the plant with successively more complex fault assumptions, respectively.

10. The method of claim 7, wherein the plurality of diagnostic abstractions includes at least one abstraction representing an interaction fault assumption and at least one abstraction representing a non-interaction fault assumption regarding resources of the plant with successively more complex fault assumptions, respectively.

11. The method of claim 10, wherein determining a current plant condition comprises identifying at least one interaction fault involving interaction of two or more resources of the plant.

12. A non-transitory computer readable medium having computer executable instructions for performing the steps of:

storing in electronic memory, a plurality of diagnostic abstractions individually representing one or more fault assumptions regarding resources of the plant with a complexity of the fault assumption or assumptions of each diagnostic abstraction being different, the plurality of diagnostic abstractions includes at least one abstraction representing a persistent fault assumption and at least one abstraction representing an intermittent fault assumption regarding resources of the plant with successively more complex fault assumptions, respectively;

selecting a first one of the plurality of diagnostic abstractions having the least complex fault assumption or assumptions regarding resources of a production plant;

determining a current plant condition based at least partially on the currently selected diagnostic abstraction, a previously executed plan, at least one corresponding observation from the plant, and a plant model;

selectively selecting another one of the diagnostic abstractions having more complex fault assumptions when a most recently selected diagnostic abstraction is logically inconsistent with the current fault status indications;

maintaining a belief model in the electronic memory, the belief model comprising at least one fault status indication for at least one resource of the plant, a list of good or exonerated resources of the plant, a list of bad or suspected resources of the plant, and a list of unknown resources of the plant;

updating the belief model based at least partially on the currently selected diagnostic abstraction, a previously executed plan, at least one corresponding observation from the plant, and the plant model; and generating at least one plan to schedule jobs to improve productivity based on said belief model to avoid using one or more resources known, or believed with high probability, to be faulty.

* * * * *

UNITED STATES PATENT AND TRADEMARK OFFICE
CERTIFICATE OF CORRECTION

PATENT NO.        : 8,359,110 B2
APPLICATION NO.   : 12/409157
DATED             : January 22, 2013
INVENTOR(S)       : Lukas D. Kuhn and Johan de Kleer Page 1 of 1

It is certified that error appears in the above-identified patent and that said Letters Patent is hereby corrected as shown below:

Title Page: Item 76 should be changed to Item 75.

Title Page: Item 73 insert --Assignee: Palo Alto Research Center Incorporated, Palo Alto, CA (US)--

Signed and Sealed this
Twenty-fifth Day of March, 2014

Michelle K. Lee
*Deputy Director of the United States Patent and Trademark Office*